(12) United States Patent
Châtenay

(10) Patent No.: US 10,247,837 B2
(45) Date of Patent: Apr. 2, 2019

(54) PORTABLE SEISMIC SURVEY DEVICE AND METHOD

(71) Applicant: Explor Geophysical, Ltd, Calgary (CA)

(72) Inventor: Allan Châtenay, Calgary (CA)

(73) Assignee: Explor Geophysical Ltd., Calgary (CA)

( * ) Notice: Subject to any disclaimer, the term of this patent is extended or adjusted under 35 U.S.C. 154(b) by 59 days.

(21) Appl. No.: 15/442,870

(22) Filed: Feb. 27, 2017

(65) Prior Publication Data

US 2018/0246234 A1    Aug. 30, 2018

(51) Int. Cl.
| | |
|---|---|
| *G01V 1/104* | (2006.01) |
| *G01V 1/00* | (2006.01) |
| *E21B 47/00* | (2012.01) |
| *E21B 47/022* | (2012.01) |
| *E21B 49/00* | (2006.01) |

(52) U.S. Cl.
CPC .......... *G01V 1/104* (2013.01); *E21B 47/0003* (2013.01); *E21B 47/02208* (2013.01); *E21B 49/00* (2013.01); *G01V 1/003* (2013.01); *G01V 2210/121* (2013.01)

(58) Field of Classification Search
CPC .. G01V 1/104; G01V 1/003; G01V 2210/121; E21B 47/02208; E21B 47/0003; E21B 49/00; F42D 3/06
See application file for complete search history.

(56) References Cited

U.S. PATENT DOCUMENTS

| | | | |
|---|---|---|---|
| 145,000 A | 11/1873 | McDonald | |
| 3,915,256 A | 10/1975 | McCoy | |
| 4,147,228 A | 4/1979 | Bouyoucos | |
| 4,223,759 A | 9/1980 | Martin | |
| 4,324,310 A * | 4/1982 | Wener | G01V 1/104 175/4.55 |
| 4,334,591 A | 6/1982 | Martin | |
| 4,359,131 A | 11/1982 | Martin | |
| 4,418,786 A | 12/1983 | Martin | |
| 4,867,266 A | 9/1989 | Martin | |
| 6,536,553 B1 | 3/2003 | Scanlon | |

(Continued)

FOREIGN PATENT DOCUMENTS

| | | |
|---|---|---|
| CA | 1168347 A1 | 5/1984 |
| CA | 2504119 A1 | 10/2005 |

(Continued)

*Primary Examiner* — Daniel Pihulic
(74) *Attorney, Agent, or Firm* — David Guerra

(57) ABSTRACT

The present invention is essentially a portable seismic survey device and method using reflection seismology for mapping subterranean formations. The device includes an upper assembly, a firing pin operably associated with a firing pin actuator, a lower assembly including a cartridge holder capable of retaining a blasting cartridge, and a detonation sensor capable of detecting detonation of the blasting cartridge. The detonation sensor transmits a signal to an event marking device to trigger a recordation of detonation time and geographic location of the seismic survey device. A seismic wave is generated upon detonation which is then reflected back toward seismometers. Data from the event marking device and seismometers can then be processed to provide geological formation information.

25 Claims, 7 Drawing Sheets

(56) References Cited

U.S. PATENT DOCUMENTS

| | | |
|---|---|---|
| 7,395,897 B2 | 7/2008 | Gilmer et al. |
| 7,918,307 B2 | 4/2011 | Vedders |
| 8,107,317 B2 | 1/2012 | Underhill et al. |
| 8,499,679 B1 | 8/2013 | Crowell |
| 8,842,493 B2 | 9/2014 | Almaas et al. |
| 2012/0176863 A1 | 7/2012 | Jurok et al. |
| 2014/0111207 A1 | 4/2014 | Kraemer |
| 2018/0246234 A1* | 8/2018 | Chatenay ............ E21B 47/0003 |

FOREIGN PATENT DOCUMENTS

| | | | |
|---|---|---|---|
| CA | 2763973 A1 | 7/2012 | |
| CA | 2495141 C | 4/2013 | |
| CA | 2674567 C | 6/2016 | |
| CA | 2959928 A1 * | 8/2018 | ......... E21B 47/0003 |
| GB | 2437381 * | 10/2007 | |
| WO | 9629613 A1 | 9/1996 | |
| WO | WO-2018152612 A1 * | 8/2018 | ......... E21B 47/0003 |

\* cited by examiner

PORTABLE SEISMIC SURVEY DEVICE AND METHOD

BACKGROUND OF THE INVENTION

Field of the Invention

The present invention relates to a portable seismic survey device and method for use in connection with reflection seismology for mapping subterranean formations.

Description of the Prior Art

It is known in the petroleum, gas, mineral and water exploration industries to use seismic geophysical surveys to map subterranean formations, such as but not limited to: stratigraphy of subterranean formations, lateral continuity of geologic layers, locations of buried paleochannels, positions of faults in sedimentary layers, basement topography, and others. These maps can be deduced through analysis of the nature of reflections and refractions of generated seismic waves from interfaces between layers within the subterranean formation.

Typically, a seismic energy source is used to generate seismic waves that travel through the earth and are then reflected by various subterranean formations to the earth's surface. At the surface, these reflected seismic waves are detected by an array of ground motion sensors, known as seismometers or geophones, which convert the detected waves into electrical signals. The electrical signals are stored and analyzed by a computer modeling system to determine and display the nature of the subterranean formations at a location surrounding the point the seismic waves were generated.

Known seismic energy source devices can be in communication with a global position system (GPS) or other telemetry systems to provide logging of the precise location and time of seismic wave generation. Typically, the seismic energy source device is controlled and activated automatically by the telemetry system, which can present a potential disadvantage since multiple error logs can occur by misfires of the seismic energy source device. Further disadvantage of these known systems is that the user does not having full control of the seismic energy source device since detonation is controlled by the telemetry system.

It has become desirable to extend drilling to locations that are environmentally sensitive or with limited vehicular access, which appear to overlay oil and gas formations. Thus portable seismic energy source devices have been developed and used.

It has been known to use vehicles that transport or tow a seismic source device from location to location. At a given location the seismic source is placed in direct contact with the ground. The seismic source device is activated to generate a seismic wave. However, the traditional seismic source devices are very heavy and thus need to be deployed by a vehicle, and they typically require large charges for creating a seismic wave that can travel deep through the Earth. As the environmentally sensitive areas prohibit or strictly limit the access of heavy duty equipment or vehicles, the existing methods for generating seismic waves are not suitable for these areas. These large systems are also undesirable for application in shallow wells that span large lateral distances.

Seismic data is critical to oil and gas companies during the exploration and development of oil and gas reserves. Seismic data is used from the earliest point in exploration right through the life of an oil or gas field, and in some cases even after the well has been abandoned. Seismic data is used for many different purposes: broad based analysis of prospective hydrocarbon basins, localized exploration of a prospective area, high resolution imaging prior to drilling a well, throughout the drilling process (including pore pressure prediction and micro-fracture analysis), and to enhance production as a field is developed and optimized throughout its productive life.

While the above-described devices fulfill their respective, particular objectives and requirements, the aforementioned patents do not describe a portable seismic survey device and method that allows reflection seismology for mapping subterranean formations with detonation triggered event marking.

Therefore, a need exists for a new and novel portable seismic survey device and method that can be used for reflection seismology for mapping subterranean formations. In this regard, the present invention substantially fulfills this need. In this respect, the portable seismic survey device and method according to the present invention substantially departs from the conventional concepts and designs of the prior art, and in doing so provides an apparatus primarily developed for the purpose of reflection seismology for mapping subterranean formations.

SUMMARY OF THE INVENTION

In view of the foregoing disadvantages inherent in the known types of seismic source systems now present, the present invention provides a novel portable seismic survey device and method, and overcomes the above-mentioned disadvantages and drawbacks of known types of seismic source systems. As such, the general purpose of the present invention, which will be described subsequently in greater detail, is to provide a new and novel portable seismic survey device and method which has all the advantages of the prior art mentioned heretofore and many novel features that result in a portable seismic survey device and method which is not anticipated, rendered obvious, suggested, or even implied by the prior art, either alone or in any combination thereof.

To attain this, the present invention essentially includes a seismic survey device including an upper assembly, a firing pin operably associated with a firing pin actuator, a lower assembly including a cartridge holder, and a detonation sensor. The cartridge holder can have a configuration capable of retaining a blasting cartridge so that the firing pin is capable of operationally detonating the blasting cartridge. The detonation sensor is capable of detecting a detonation condition of the blasting cartridge.

At least one tube can be attached to the upper assembly, with the lower assembly attachable to the tube. The firing pin can be slidably receivable in the tube.

The upper assembly can further define an internal cavity and at least one longitudinal slot in communication with the internal cavity. The longitudinal slot can have a configuration capable of slidably receiving a portion of a sensor holding assembly. A portion of the detonation sensor can be associated with the sensor holding assembly. The firing pin actuator can be slidably received in the internal cavity.

The sensor holding assembly can include an actuator handle featuring the portion slidably receivable in the longitudinal slot. The actuator handle can define an actuator handle cavity with a configuration capable of receiving at least a portion of the detonation sensor.

The lower assembly can further include a firing chamber attachable to the cartridge holder. The firing chamber can define a firing chamber bore having a configuration capable of receiving therethrough a firing tip of the firing pin. The firing tip is capable of striking a primer end of the blasting cartridge to initiate detonation.

The firing chamber can further define an internal firing chamber cavity in communication with the firing chamber bore. The internal firing chamber cavity can have a configuration capable of receiving at least a portion of the cartridge holder.

There has thus been outlined, rather broadly, features of the invention in order that the detailed description thereof that follows may be better understood and in order that the present contribution to the art may be better appreciated.

The invention may also include a lower tube attachable to the tube and the firing chamber. The lower tube can include channels defined in an external surface thereof.

Still further, the invention may include at least one foot support assembly and/or at least one handle.

Additionally, the cartridge holder may include a flanged end that can define radially arranged notches having a configuration capable of being engageable with a tool for rotation of the cartridge holder.

The invention may further include at least one firing pin guide attachable to the firing pin. The firing pin guide can have a configuration capable of being slidably received in the tube or the lower tube.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of the present invention, but nonetheless illustrative, embodiments of the present invention when taken in conjunction with the accompanying drawings.

As such, those skilled in the art will appreciate that the conception, upon which this disclosure is based, may readily be utilized as a basis for the designing of other structures, methods and systems for carrying out the several purposes of the present invention. It is, therefore, that the claims be regarded as including such equivalent constructions insofar as they do not depart from the spirit and scope of the present invention.

It is therefore an object of the present invention to provide a new and novel portable seismic survey device and method that has all the advantages of the prior art seismic source systems and none of the disadvantages.

It is another object of the present invention to provide a new and novel portable seismic survey device and method that may be easily and efficiently manufactured and marketed.

An even further object of the present invention is to provide a new and novel portable seismic survey device and method that has a low cost of manufacture with regard to both materials and labor, and which accordingly is then susceptible of low prices of sale to the consuming public, thereby making such portable seismic survey device and method economically available to the buying public.

Still another object of the present invention is to provide a portable seismic survey device and method for reflection seismology for mapping subterranean formations. This allows for the portability of the seismic survey device that controls and triggers the event marking device at the time of detonation.

Lastly, it is an object of the present invention to provide a new and novel method of using a seismic survey device including the steps of drilling at least one borehole into the ground to be surveyed, and providing at least one portable seismic survey device. Then inserting a lower assembly of the portable seismic survey device into the borehole. Then further, communicating a detonation sensor of the portable seismic survey device with at least one event marking device. After which, detonating a blasting cartridge inside the borehole using the portable seismic survey device, and detecting detonation of the blasting cartridge using a detonation sensor associated with the portable seismic survey device. Then transmitting a signal from the detonation sensor to the event marking device to trigger a recordation of a detonation time and geographic location of the seismic survey device.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
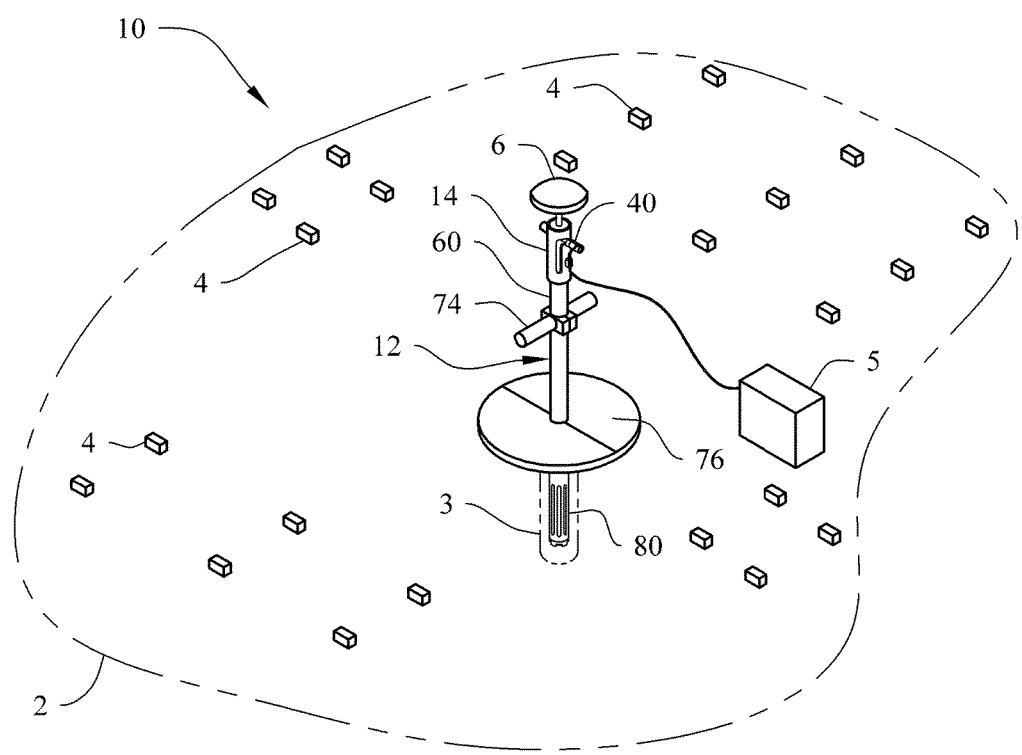
FIG. 1 is a perspective view of an embodiment of the portable seismic survey device and method constructed in accordance with the principles of the present invention, with the phantom lines depicting environmental structure and forming no part of the claimed invention.

Referring now to the drawings, and particularly to FIGS. 1-12, an embodiment of the portable seismic survey device and method of the present invention is shown and generally designated by the reference numeral 10.

In FIG. 1, a new and novel portable seismic survey device and method 10 of the present invention for reflection seismology intended for mapping subterranean formations is illustrated and will be described. To collect seismic survey data in a field 2 to be surveyed, a plurality (tens, hundreds or thousands) of ground seismometers 4 can be positioned at predetermined locations in or on the field 2. The most commonly used seismometer 4 can be a small, portable single component geophone that is planted into the earth and which converts vertical ground motion into a small analog electrical signal. Of late, such sensors have been manufactured with GPS receivers locally coupled to the sensor as well as a battery and sufficient memory to record the signals detected by each sensor continuously for a period of several weeks. It can be appreciated that more sensitive digital sensing units that sense ground motion in three dimensions can be used with the present invention thereby providing better seismic data and new opportunities for sub-surface imaging.

Ground motion can then be created with small explosive charges positioned inside a borehole 3 drilled into the surface of the earth at a variable angle and/or a depth that can be variably determined based on local conditions using a portable seismic source device 12. The angle of the borehole 3 can be configured to facilitate generation of shear waves. The timing and position of these seismic sources should be very accurate, timed to the fraction of a millisecond, with positions accuracies ranging from with 5 meters to less than a meter depending on the geophysical acquisition objectives.

As the seismic waves of ground motion created by the seismic source device 12 travels through the earth, they reflect and refract off of subsurface geological layers. At the boundary between each geological layer, some energy will be reflected and the rest of the energy will continue through the boundary. As these reflected and refracted signals are detected by the seismometers 4 at the surface, they are either recorded locally into the digital memory coupled to the sensor or they are transmitted either via cable or wireless transmission to a central recording system (not shown) that records all of the reflected ground motion detected by all of the seismometers 4 at the surface.

By processing these data, a highly detailed image of subsurface layers of the field 2 can be created. This enables geophysicists, geologists and engineers to interpret and understand the subsurface layers with advantages over other imaging technology.

More particularly, the seismic source device 12 can be in communication with a GPS event marking device 5 that is in communication with a GPS or location antenna 6 that can be mounted to a threaded stud 18 at the top of seismic source device 12. The GPS event marking device 5 can be, but not limited to, a Leica GS25 GNSS instrument or similar device, that can be portable and/or worn on a backpack. The GPS event marking device 5 can be in communication with the central recording system in real time or event data can be uploaded to the central recording system at a later time.

Figure 2:
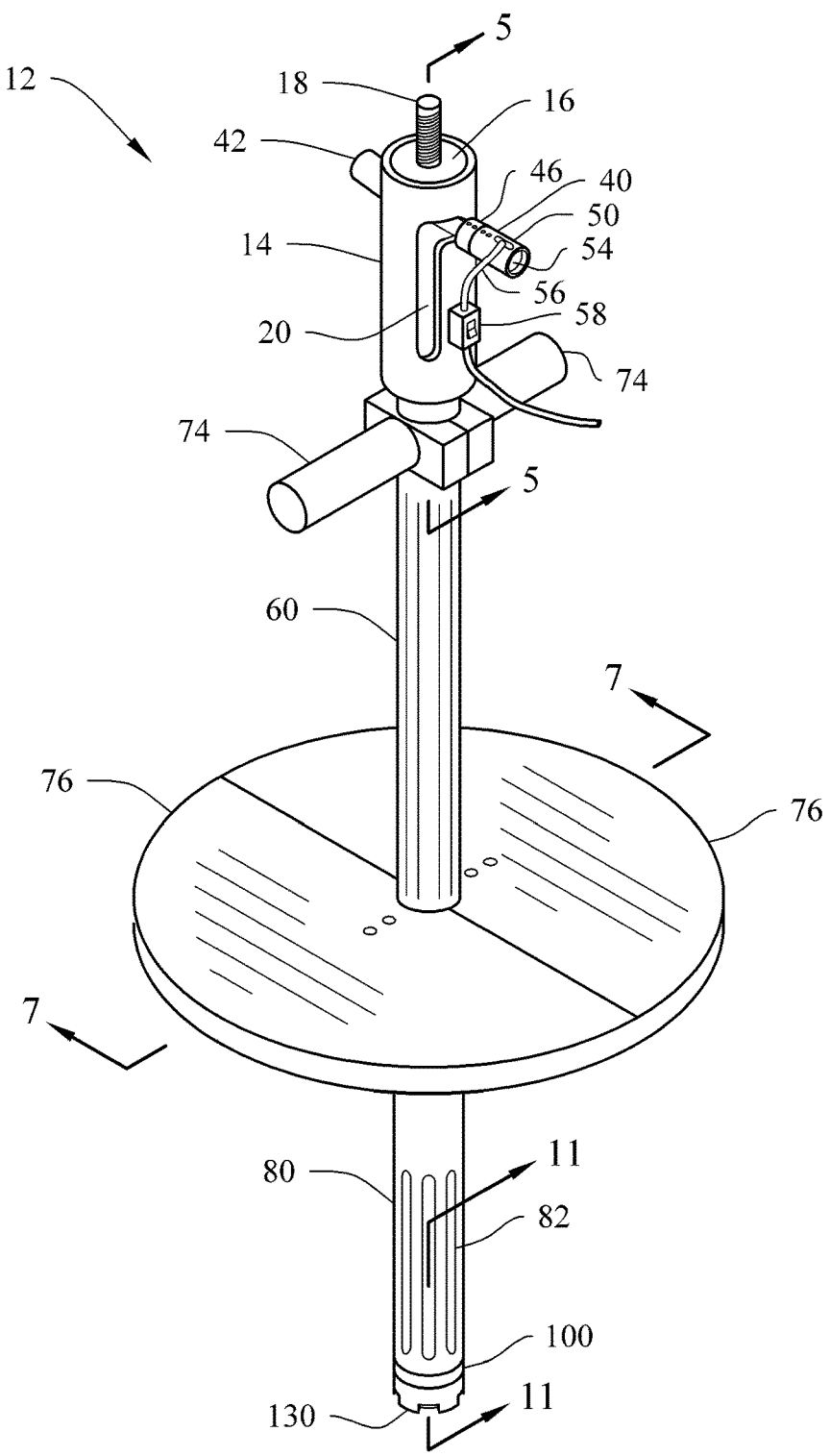
FIG. 2 is a perspective view of the portable seismic survey device of the present invention.

As best illustrated in FIG. 2, the seismic source device 12 can include an upper assembly 14, a sensor holding assembly 40, a main tube 60, a foot support assembly 76 and a lower tube 80. The lower tube 80 can have a ground insertion portion with an end including a firing chamber 100 and a cartridge holder 130. It can be appreciated that the firing chamber 100 and cartridge holder 130 may be attached directly to the main tube 60, without the use of the lower tube 80. It can also be appreciated that the length of main tube 60 and lower tube 80 as well as the position and diameter of foot support assembly 76 can be varied to account for different desired hole depths and local conditions.

Figure 3:
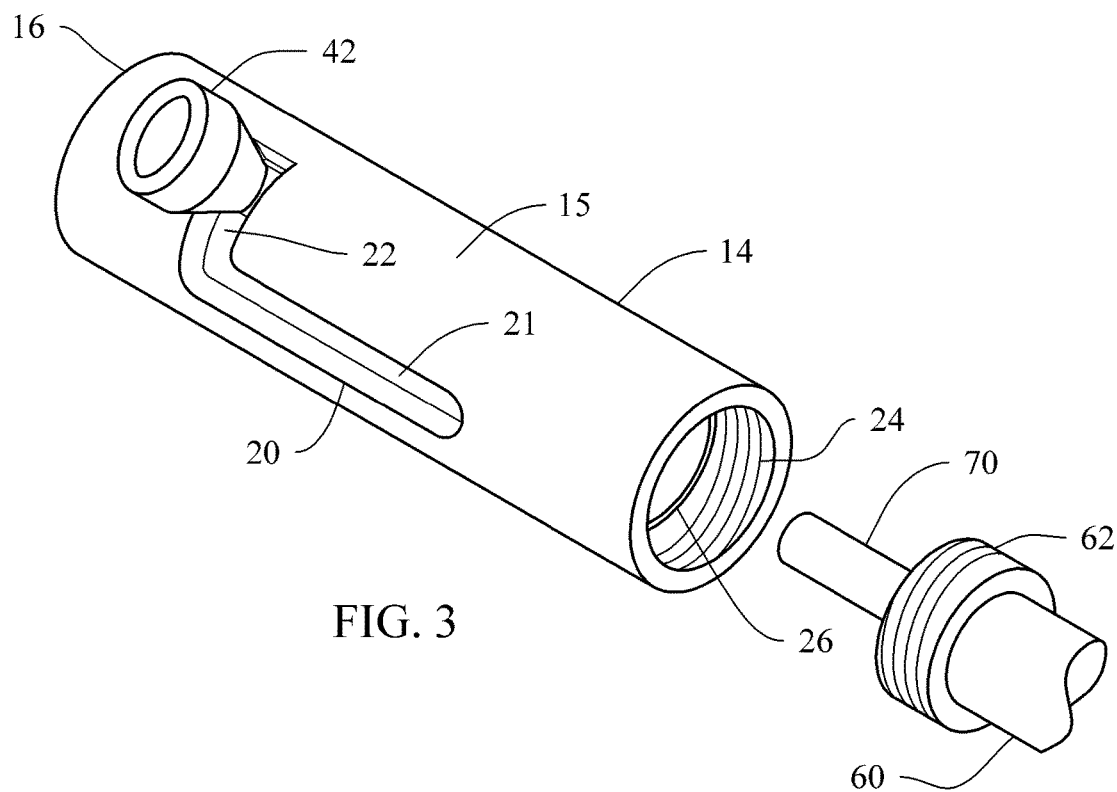
FIG. 3 is an exploded perspective view of the upper assembly of the present invention.

Referring to FIG. 3, the upper assembly 14 can include a tubular housing 15 defining a hollow interior or internal cavity, and featuring a first end 16 closed off with an attachable end cap 17 and the threaded stud 18, and a second end 24. The threaded stud 18 can be threadably engageable with the end cap 17, with an end of the threaded stud 18 being receivable in the hollow interior. The threaded stud 18 can include a hook end for hanging the seismic source device 12 or additional peripheral devices can be threadably attached to the threaded stud 18. The threaded stud 18 can further include a quick release mechanism for fitting the peripheral device and/or the GPS antenna 6 thereto. A jam nut and lock washer can be threadably engaged with the threaded stud 18 to more securely attach the threaded stud 18 in position and prevent rotation thereof.

A pair of guide slots 20 can be defined through the tubular housing 15 opposite each other, with the guide slots 20 being in communication with the hollow interior. The guide slots 20 can include a longitudinal slot 21 substantially parallel with a longitudinal axis of the upper assembly 14, and a lateral slot 22.

The second end 24 can be annularly notched or recessed to define a diameter greater than the hollow interior thereby creating an upper assembly ledge 26. The second end 24 can include internal threading or other engagement means.

The main tube 60 defines a hollow interior capable of freely receiving a firing pin 70 therethrough, and a flanged first end 62. The flanged first end 62 has a configuration capable of being received in the second end 24 and capable of abutting against the upper assembly ledge 26 when fully assembled. The flanged first end 62 can further include external threading or engagement means capable of engaging with the internal threading of the second end 24, thereby connecting the upper assembly 14 and the main tube 60 together.

Figure 4:
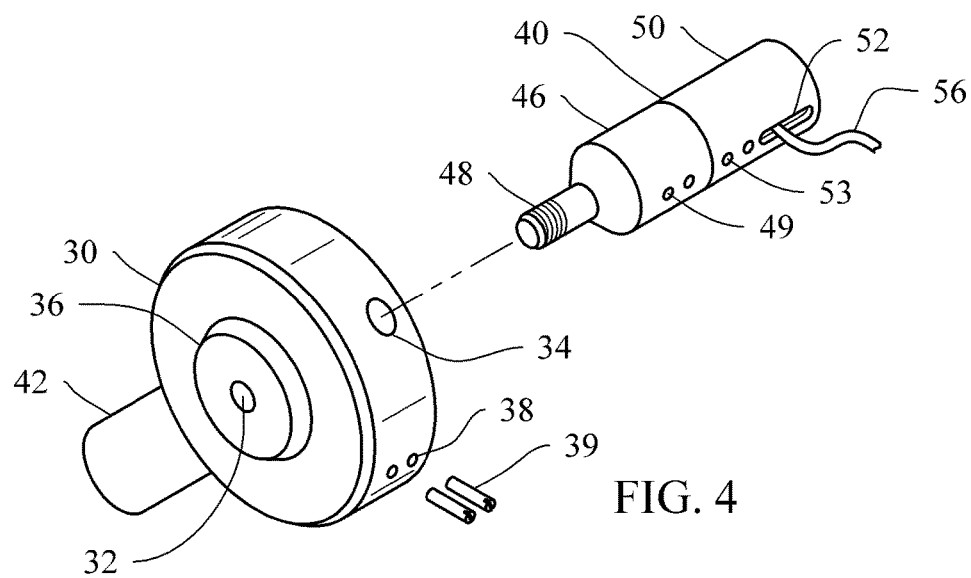
FIG. 4 is an exploded perspective view of the firing weight and piezo holder assembly of the present invention.

Referring to FIG. 4, a firing pin actuator 30 can be a firing weight that can have a configuration capable of being slidably receivable in the hollow interior of the upper assembly 14. The firing weight 30 can include a bore 32 defined parallel with a longitudinal axis of the firing weight 30 which is capable of receiving a first end portion of the firing pin 70. The firing weight 30 can further include a pair of handle bores 34 opposite each other and lateral to the bore 32, and an extended end portion 36. The extended end portion 36 can feature tapered sides.

It can be appreciated that the firing pin actuator 30 can be in the alternative, but not limited to, a biasing element, a linear drive means or a rotary drive means, which is capable of advancing and/or retracting the firing pin 70.

The portion of the firing pin 70 received in the bore 32 is secured in place by at least one set screw 39 threadably engaged with at least one set screw bore 38 defined laterally and in communication with the bore 32. The set screw 39 is capable of contacting an external surface of the firing pin 70 thereby securing the firing pin 70 and the firing weight 30 together. The firing pin 70 can be pitted for nesting of the set screw 39, or a hole can be defined through the firing pin 70 to receive the set screw 39, or even still the firing pin 70 can be textured to create a gripping force with the set screw 39 and/or the surface of the actuator 30 that defines the bore 32.

A first actuator handle 42 includes a threaded end 44 capable of engaging with one of the handle bores 34, wherein the threaded end 44 can have a configuration capable of being slidably received through one of the guide slots 20.

The sensor holding assembly 40 can include a second actuator handle 46 featuring a threaded end 48 capable of engaging with the other of the handle bores 34, wherein the threaded end 48 can have a configuration capable of being slidably received through the other of the guide slots 20. The second actuator handle 46 can include a recess with a configuration capable of receiving at least a first end portion of a detonation sensor 54. At least one set screw can be threadably engageable with a set screw bore 49 defined laterally through the second actuator handle 46 so as to secure the first end portion of the detonation sensor 54 to the second actuator handle 46. It can be appreciated that the first actuator handle 42 and second first actuator handle 46 are identical, thereby simplifying manufacturing and assembly.

Alternatively, a sensor holder 50 can be used for additional securement of the detonation sensor 54. The sensor holder 50 can include a tubular housing featuring a hollow interior, and a wiring slot 52 parallel with a longitudinal axis of the sensor holder 50. The hollow interior of the sensor holder 50 can have a configuration capable of receiving a second end portion of the detonation sensor 54, with wiring 56 of the detonation sensor 54 being passed and slidably received through wiring slot 52. At least one set screw can be threadably engageable with a set screw bore 53 defined laterally through the sensor holder 50 so as to secure the second end portion of the detonation sensor 54 to the sensor holder 50.

The detonation sensor 54 can be any sensing device that is capable of sensing an operational condition of the seismic source device 12. The detonation sensor 54 can be, but not limited to, a piezoelectric sensor that uses the piezoelectric effect to measure changes in pressure, acceleration, temperature, strain, or force by converting them to an electrical signal. The detonation sensor 54 can also be, alone or in combination, an acoustical sensor, an impact sensor, a thermal sensor, electrical contact switch (coupled with a battery) and the like. This electrical signal can then be communicated to the GPS event marking device 5 via the wiring 56 or wirelessly. The detonation sensor 54 is configured to detect an operational condition of the seismic source device 12, so as to trigger an event marking with the GPS event marking device 5.

A switch 58 can be associated with the wiring 56 to control voltage or signal transmission from the detonation sensor 54 to the GPS event marking device 5. Interrupting voltage or signal transmission from the detonation sensor 54 can avoid unintentional recording and/or event marking by the GPS event marking device 5. It can be appreciated that switch 58 could be augmented with or replaced by with an electronic device capable of eliminating spurious electrical impulses originating from detonation sensor 54. Such a device could also record characteristics of those electrical impulses such as the voltage level, timing of the rise or fall in voltage, and so forth.

Figure 5:
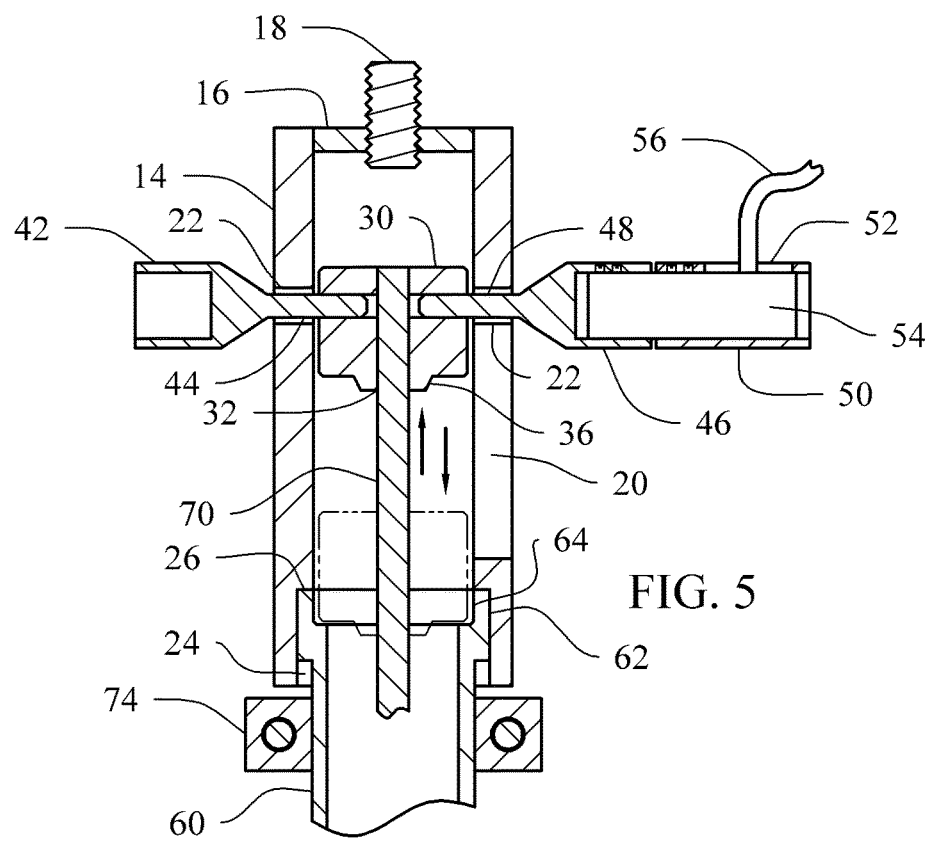
FIG. 5 is a cross-sectional view of the upper assembly taken along line 5-5 in FIG. 2.

As best illustrated in FIG. 5, the flanged first end 62 of the main tube 60 can include an internally defined annular recess 64 capable of receiving an end portion of the firing weight 30 so that at least the extended end portion 36 of the firing weight 30 is receivable in the hollow interior of the main tube 60. The recess 64 has a diameter greater than the diameter of the main tube hollow interior, thereby creating an annular ledge lateral to the main tube hollow interior.

Thus it can be appreciated that the detonation sensor 54 can be secured to the second actuator handle 46 and the piezo holder 50 exterior of the upper assembly 14, with the second actuator handle 46 being securable to the firing weight 30 located in the hollow interior of the upper assembly 14. Longitudinal movement of the firing weight 30 and firing pin 70 are dependent upon the location of the first and second actuator handle 42, 46 in relation with the guide slots 20, respectively. Specifically, the firing weight 30 and the firing pin 70 can move in a direction parallel with the longitudinal axis of the upper assembly 14 only when the threaded ends 44, 48 of the first and second actuator handles 42, 46 are in the longitudinal slot 21 of the guide slots 20, respectively.

Further movement of the firing weight 30 is prohibited when the firing weight 30 contacts the annular ledge that defines the recess 64.

It can be appreciated that the length of the longitudinal slot 21 and/or the distance of the annular ledge defining the recess 64 from the lateral slot 22 determines the travel distance of the firing weight 30 and firing pin 70.

The lateral slot 22 of the guide slots 20 illustrated in FIG. 3 may contain other features that are also within the scope of the present invention. For example, one feature of the present invention is a safety slot (not shown) that extends from the lateral slot 22 in a direction parallel with the longitudinal slot 21. The safety slot can receive the threaded ends 44, 48 of the first and second actuator handles 42, 46 in a locked position thereby preventing accidental movement into the longitudinal slot 21 and preventing unwanted dropping of the firing weight 30 and firing pin 70. Additionally, locking features can be implemented with the guide slot 20 and/or at least one of the actuator handles 42, 46 to prevent unwanted dropping of the firing weight 30 and firing pin 70.

A pair of handles 74 can be attachable to the main tube 60 by way of a clamping bracket. The clamping bracket of each of the handles 74 can be coupled together via fasteners or quick release mechanism to produce a clamping force against the main tube 60. It can be appreciated that the handles 74 can be adjustably secured along the main tube 60 at any desired location and/or orientation.

Figure 6:
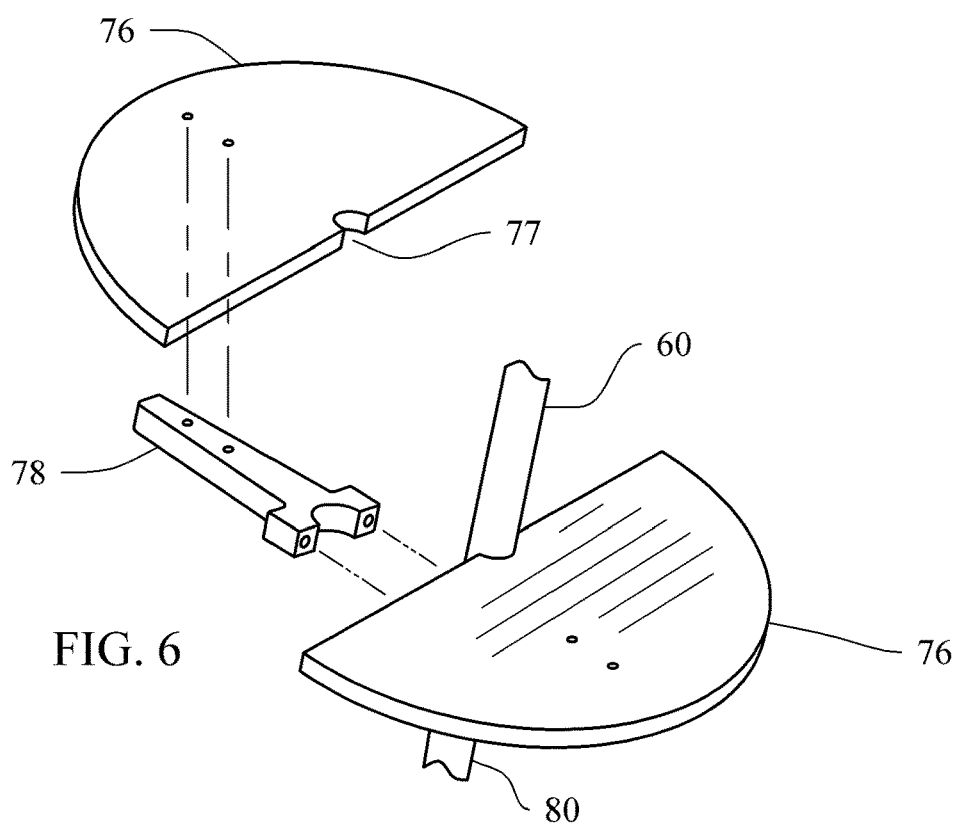
FIG. 6 is an exploded perspective view of the foot support assembly of the present invention.

Referring to FIG. 6, the foot support assembly 76 can include a pair of semicircular plates each defined a bore 77 capable of receiving the main tube 60 therethrough. Each plate 76 is securable to a foot plate support 78. Each foot plate support 78 can include a foot support clamping bracket, which can be coupled together via fasteners or quick release mechanism to produce a clamping force against the main tube 60. It can be appreciated that the foot support assembly 76 can be adjustably secured along the main tube 60 at any desired location and/or orientation.

Figure 7:
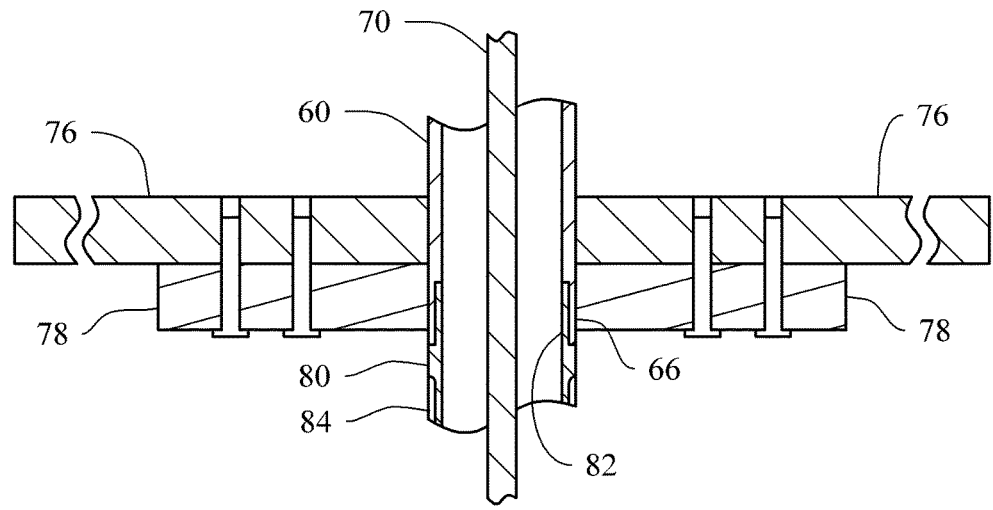
FIG. 7 is a cross-sectional view of the foot support assembly taken along line 7-7 in FIG. 2.

Turning to FIG. 7, the main tube 60 can include a second end 66 featuring an internally defined annular recess capable of engageably receiving a first end 82 of the lower tube 80. The lower tube 80 includes a hollow interior capable of freely receiving the firing pin 70 therethrough. It can be appreciated that the second end 66 of the main tube 60 and the first end 82 of the lower tube 80 can be configured so as to form a flush interior and/or exterior connection between the main tube 60 and the lower tube 80.

Figure 12:
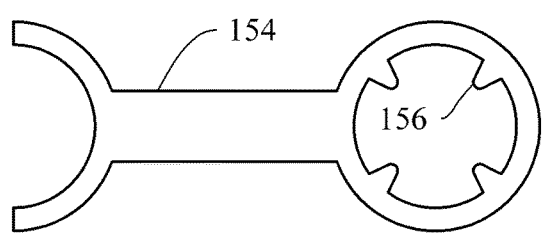
FIG. 12 is a front plane view of the shot holder tool of the present invention.

The lower tube 80 can include a plurality of channels 84 defined in an external surface thereof, as best illustrated in FIGS. 1, 2 and 12. The channels 84 prevent a vacuum from being created when inserting and/or removing the lower tube 80 in/from the ground. It can be appreciated that the lower tube 80 can include one or more soil sensing devices such as to sense, but not limited to, soil moisture, photosynthetically active radiation (PAR) at soil surface, soil temperature, soil respiration, soil heat flux, solar radiation, gas detection, radiation, PH level, geochemical measurements and the like.

Figure 8:
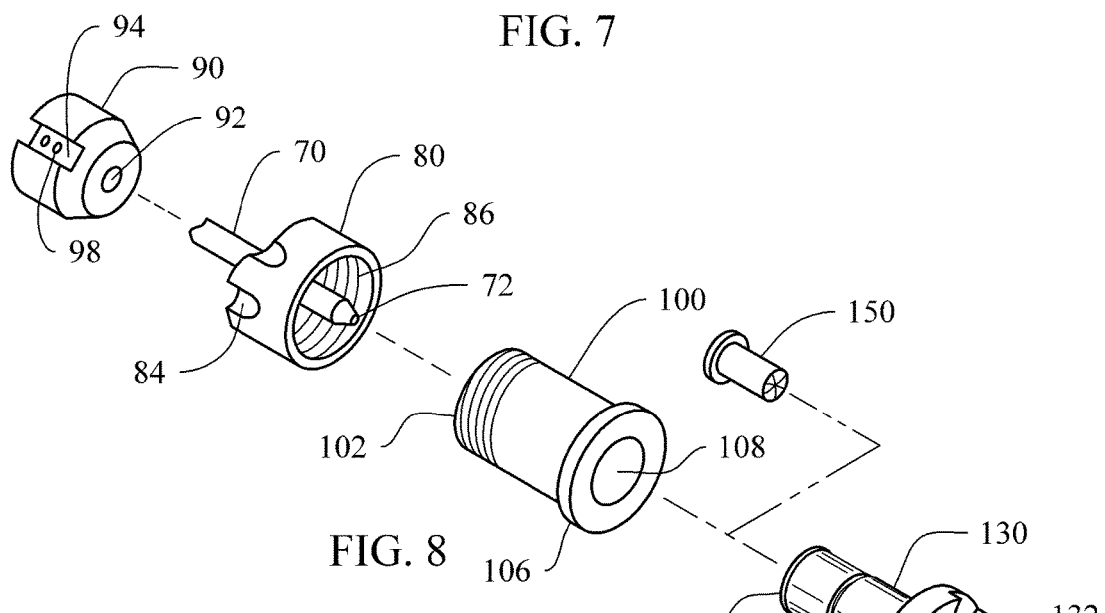
FIG. 8 is an exploded perspective view of the lower assembly, the firing pin guide, the firing pin, the firing chamber and the shot holder of the present invention.

As generally shown in FIG. 8, the lower tube assembly includes the lower tube 80, a firing chamber 100 attachable to the lower tube 80, and a cartridge holder 130 attachable to the firing chamber 100. A blasting cartridge 150 is loadable in an end of the cartridge holder 130.

Figure 11:
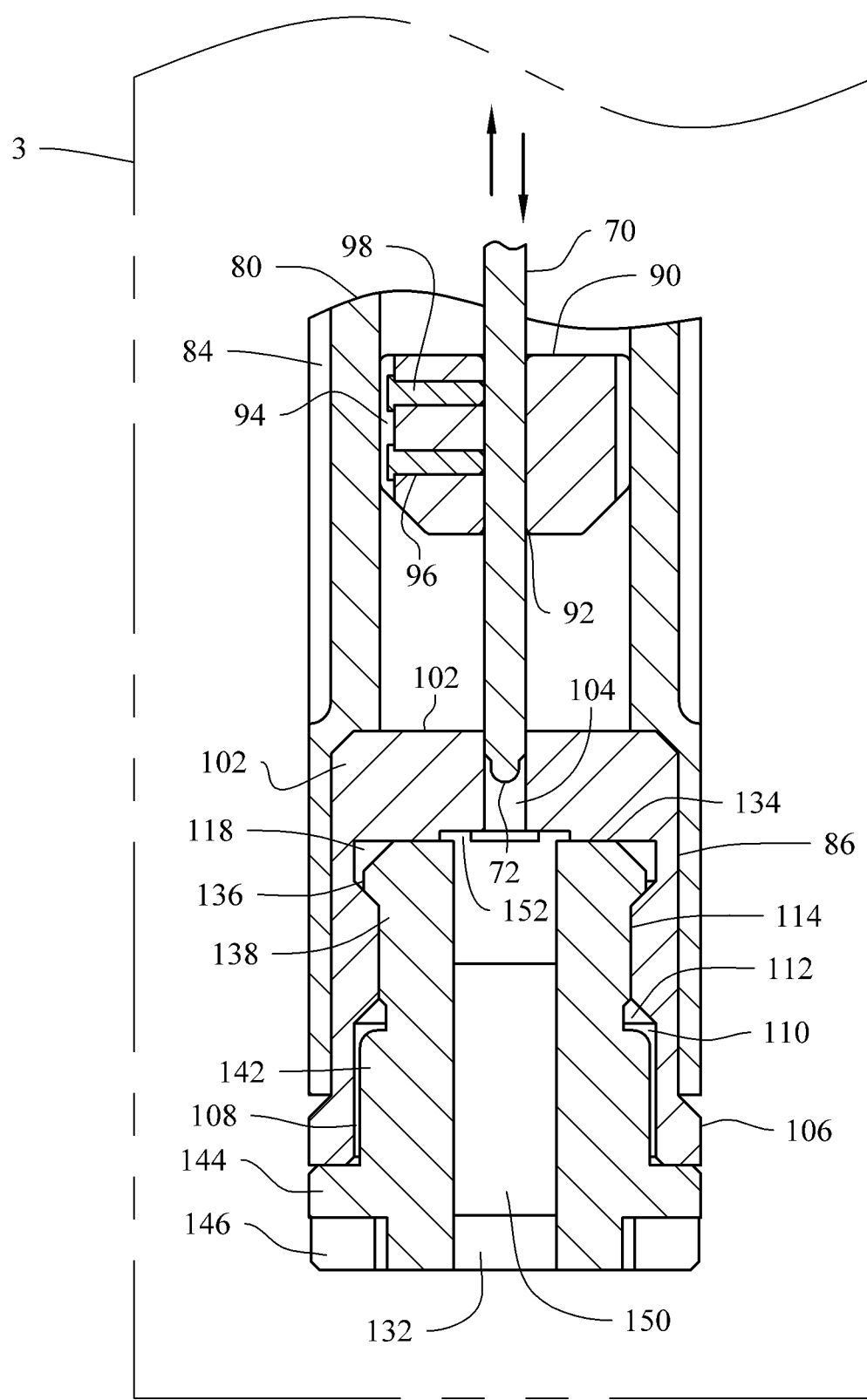
FIG. 11 is a cross-sectional view of the lower assembly taken along line 11-11 in FIG. 2.

As best illustrated in FIGS. 8 and 11, the lower tube 80 features a second end 86 that can include an internal annular notch or recess with a diameter greater than the hollow interior of lower tube 80 thereby creating a lower tube ledge. The second end 86 can include internal threading or other engagement means.

The firing pin 70 is freely received through the hollow interview of the lower tube 80, so that a firing tip 72 located at a free end of the firing pin 70 is receivable in the firing chamber 100. At least one firing pin guide 90 can be secured to the firing pin 70 to guide its movement within the main tube 60 and/or the lower tube 80. The firing pin guide 90 has a configuration capable of being slidably received within the hollow interior of the main tube 60 or the lower tube 80. A bore 92 is defined through the firing pin guide 90 parallel to its longitudinal axis, with the bore 92 being capable of receiving therethrough a portion of the firing pin 70.

The portion of the firing pin 70 received in the bore 92 is secured in place by at least one set screw 98 threadably engaged with at least one set screw bore 96 defined laterally and in communication with the bore 92. The set screw 98 is capable of contacting an external surface of the firing pin 70 thereby securing the firing pin 70 and the firing pin guide 90 together. The firing pin 70 can be pitted for nesting of the set screw 98, or a hole can be defined through the firing pin 70 to receive the set screw 98, or even still the firing pin 70 can be textured to create a gripping force with the set screw 98 and/or the surface of the firing pin guide 90 that defines the bore 92.

A notch 94 is defined along an external surface of the firing pin guide 90 to accommodate a head or protrusion of the set screw 98, thereby preventing the head or protrusion of the set screw 98 from contacting the internal surface of the main tube 60 or the lower tube 80.

Figure 9:
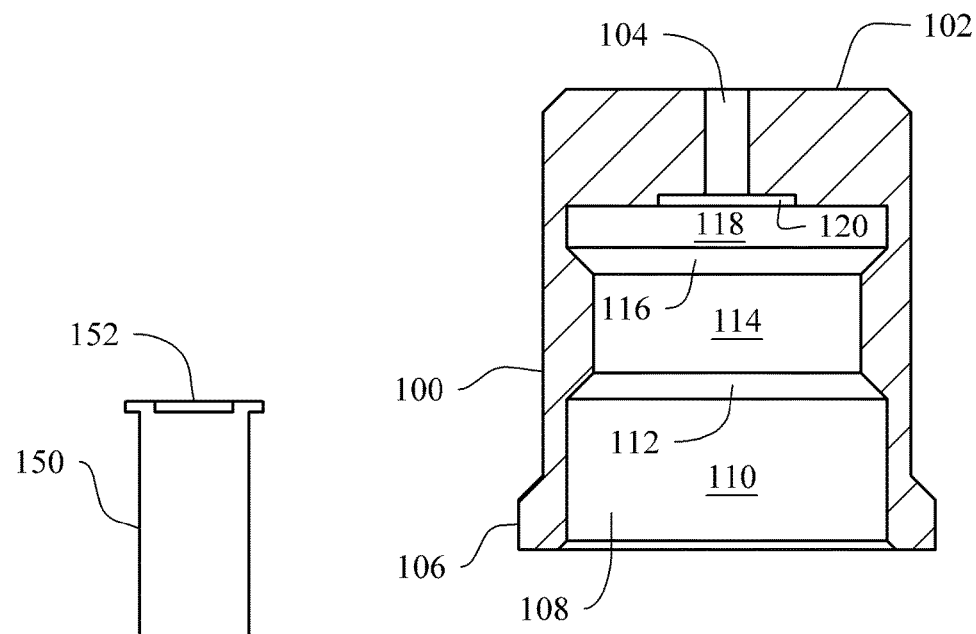
FIG. 9 is a cross-sectional view of the firing chamber of the present invention.

As best illustrated in FIGS. 9 and 11, the firing chamber 100 includes a first end 102 defining a first end bore 104 capable of slidably receiving therethrough the firing tip 72, and a flanged second end 106. An external portion of the firing chamber 100 can include external threading or other engagement means capable of engaging with the internal threading of the second end 86 of the lower tube 80 or the second end 66 of the main tube 60, thereby connecting the lower tube 80 or main tube 60 and the firing chamber 100 together. The first end 102 has a configuration capable of abutting against the ledge created by the recessed second end 86 when fully assembled.

It can be appreciated that an external surface of the flange second end 106 can include protrusions and/or detents that are engageable with a tool to rotate the firing chamber 100 thereby assisting in the assembling and/or disassembling thereof.

The firing chamber 100 can further define an internal cavity 108 capable of receiving a portion of the cartridge holder 130, with the internal cavity 108 being in communication with the first end bore 104. The internal cavity 108 can include an open end cavity 110, a first transitional cavity portion 112 in communication with the open end cavity 110, an intermediate cavity 114 in communication with the first transitional cavity portion 112, a second transitional cavity portion 116 in communication with the intermediate cavity 114, and a close end cavity 118 in communication with the second transitional cavity portion 116 and the first end bore 104.

The intermediate cavity 114 has a diameter less than a diameter of the open end cavity 110 and/or the close end cavity 118, with the first and second transitional cavity portions 112, 116 having a planar or arcuate profile.

A cartridge cap recess 120 can be defined in the firing chamber 100 adjacent to and in communication with the close end cavity 118. The cartridge cap recess 120 is capable of receiving a primer end 152 of the blasting cartridge 150.

Figure 10:
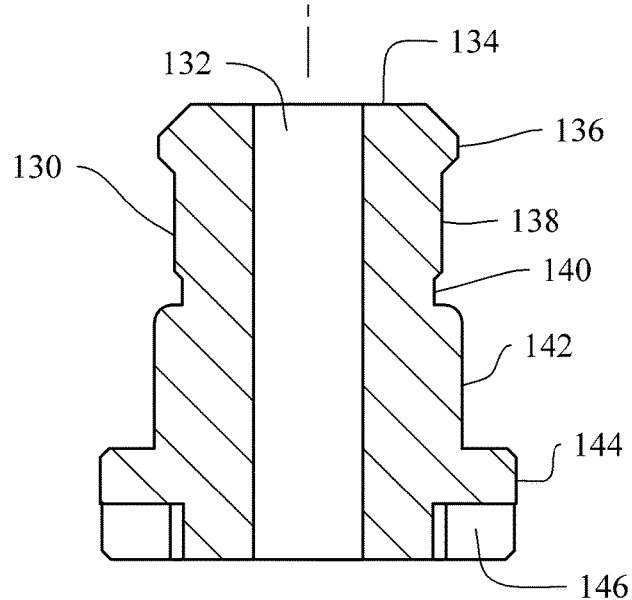
FIG. 10 is a cross-sectional view of the shot holder with an exploded cartridge of the present invention.

As best illustrated in FIGS. 10 and 11, the cartridge holder 130 can include a through bore 132 defined through the cartridge holder 130 parallel with a longitudinal axis thereof. The through bore 132 is capable of receiving a body of the blasting cartridge 150 with a diameter less than a diameter of the primer end 152, thereby preventing the primer end 152 from passing therethrough. Consequently, the primer end 152 can abut against a first end 134 of the cartridge holder 130.

The cartridge holder 130 can include a flanged portion 136 adjacent the first end 134, an intermediate portion 138 adjacent the flanged portion 136, a transitional portion 140 adjacent the intermediate portion 138, a guide portion 142 adjacent the transitional portion 140, and a flanged end 144 adjacent the guide portion 142.

The first end 134 is capable of traveling through the open end cavity 110 and the intermediate cavity 114 so as to be receivable in the close end cavity 118 of the firing chamber 100 when assembled. The intermediate portion 138 is capable of traveling through the open end cavity 110, and can include external threading or other engagement means engageable with internal threading of the intermediate cavity 114 of the firing chamber 100. The guide portion 142 is capable of being receivable in the open end cavity 110 of the firing chamber 100.

The flanged end 144 can include radial notches 146 that are engageable with teeth 156 of a tool 154 (FIG. 12) such as, but not limited to, a wrench, a socket, pliers and the like. The tool 154 is capable of rotating the cartridge holder 130 thereby assisting in the assembling and/or disassembling thereof.

As best illustrated in FIG. 11, the blasting cartridge 150 is received in the bore 132 of the cartridge holder 130 so that the primer end 152 abuts the first end 134. The first end 134 of the cartridge holder 130 is received in the internal cavity 108 of the firing chamber 100 so that the cartridge holder 130 is joined to the firing chamber 100. The first end 102 of the firing chamber 100, with the assembled cartridge holder 130, is then received in the second end 86 of the lower tube 80.

When assembled, the firing pin 70 can reciprocally move within the hollow interior of the lower tube 80 while being guided by the firing pin guide 90 attached to the firing pin 70. The firing tip 72 can reciprocally move within the first end bore 104 so as to impact the primer end 152 of the blasting cartridge 150.

In use, it can now be understood that at least one borehole 3 is drilled below the surface of the earth 2. Ground seismometers 4 are positioned at predetermined locations in or on the field 2 at locations associated with the borehole 3. The present invention can be used, but not limited to, oil and gas exploration, geotechnical work associated with engineering bridges, pipelines, roadways, tunnels and the like. Imaging of caprock and the underlying reservoir(s) associated with SAGD production is also envisioned for possible uses of the present invention.

A user would insert the blasting cartridge 150 into the bore 132 of the cartridge holder 130 with its primer end 152 abutting the first end 134 of the cartridge holder 130. The cartridge holder 130 can then be coupled to the firing chamber 100. The tool 154 can be used to assist in engaging the cartridge holder 130 with the firing chamber 100.

For safety, the user would position and retain the threaded ends 44, 48 of the first and second actuator handles 42, 46 in their respective lateral slot 22 so that the firing weight 30 and firing pin 70 are in a non-operable position. The detonation sensor 54 is secured to the second actuator handle 46 and the piezo holder 50.

While in this non-operable position, the firing chamber 100 and the assemble cartridge holder 130 can then be coupled to the second end 86 of the lower tube 80, with the firing tip 72 adjacent or received in the first end bore 104 of the firing chamber 100. The tool 154 can be used to assist in engaging the assembled firing chamber 100 and cartridge holder 130 with the lower tube 80 or the main tube 60.

The seismic source device 12 can then be inserted into the borehole 3 so that it is in a substantially vertical orientation. The user can then stand on the foot support assembly 76, and can grasp as least one of the handles 74.

When ready, the user can operate the switch 58 to allow communication from the detonation sensor 54 to the GPS event marking device 5, and then move the first actuator handle 42 and/or second actuator handle 46 so that their threaded ends 44, 48 are moved out of their respective lateral slot 22 and into their respective longitudinal slot 21. In this operable position, the threaded ends 44, 48 of the first and second actuator handles 42, 46 are free to drop or travel along the longitudinal slot, due to gravity and the weight of the firing weight 30 or any other driving force.

As the firing weight 30 drops it simultaneously moves the firing pin 70 toward the firing chamber 100 until the firing tip 72 strikes the primer end 152 of the blasting cartridge 150, thereby detonating the blasting cartridge 150 inside the borehole 3. Upon contact, the blasting cartridge 150 is detonated thereby creating a seismic wave that propagates from inside the borehole 3 and through the earth until it is reflected and refracted off of subsurface geological layers in the field 2.

The detonation sensor 54 detects the detonation of the blasting cartridge 150 and generates a voltage or signal to the GPS event marking device 5. The GPS event marking device 5 is then triggered by this signal from the detonation sensor 54 to record the precise time (T=0) and geographical location of detonation. Detonation time (T=0) can be recorded with sub-millisecond accuracy. It can be appreciated that the detonation sensor 54 triggers and controls the operation of the GPS event marking device 5, and not the GPS event marking device 5 controlling the time of detonation. It can be appreciated that blasting cartridge 150 can be engineered with a delay, in which case the known delay can be added to the detonation time signaled by the detonation sensor 54 to provide a more accurate adjusted detonation time (T=0).

The reflected and refracted waves travel back toward the ground seismometers 4, which may also be equipped with GPS units that record reception time and/or geographical location. Detonation time from the GPS event marking device 5 and reception times from the seismometers 4 can be communicated, along with geographical locations, to the central recording system to be correlated. The central recording system can then process detonation time and location, and reception times and locations, to provide geological formation information.

Alternatively, the second end 66 of the main tube 60 and the first end 82 of the lower tube 80 can be associated with a bearing, and a drive means can be coupled to the lower tube 80 so as to rotate the lower tube 80 in relation to the main tube 60. The lower tube 80 or the cartridge holder 130 can further include a drilling bit or teeth means that is capable of drilling into the ground. Thus combining a drilling means with the lower assembly.

It can further be appreciated that the lower assembly can include an automatic blasting cartridge loading means, which is capable of removing a spent blasting cartridge and loading a new blasting cartridge for subsequent use. The seismic source device 12 can further include a holding device capable of holding one or more blasting cartridges 150. The firing pin 70 can have a configuration capable of simultaneously detonating several blasting cartridges 150, some of which would have different orientations (vertical, lateral, etc.).

Still further, it can be appreciated that the seismic source device 12 can include a spirit (bubble) level or an electronic level having a configuration capable of indicating an angle of the device 12 relative to the earth's nadir.

Even still further, it can be appreciated that all the above described threading engagements can be replaced with any mechanical engagement means such as, but not limited to, ratchets, clips, clasps, magnetics, tabs, keys, wedges, press fit surfaces, adhesives, welding and the like. Additionally, any or all transitional edges can be chamfered or beveled.

While embodiments of the portable seismic survey device and method have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seismic survey system comprising:
    an upper assembly;
    a firing pin operably associated with a firing pin actuator;
    a lower assembly including a cartridge holder having a configuration capable of retaining a blasting cartridge so that said firing pin is capable of operationally detonating the blasting cartridge; and
    at least one detonation sensor capable of detecting a detonation condition of the blasting cartridge, said detonation sensor being configured to transmit a signal to an event marking device upon detecting of the detonation condition;
    wherein said event marking device is configured to determine a detonation time and a geographic location of said seismic survey device upon triggering by receipt of said signal.

2. The seismic survey system of claim 1, wherein said detonation sensor is operably associated with said upper assembly.

3. The seismic survey system of claim 1 further comprising at least one tube attachable to said upper assembly and said lower assembly.

4. The seismic survey system of claim 3, wherein said upper assembly defines an internal cavity having a configuration capable of receiving said firing pin actuator.

5. The seismic survey system of claim 4, wherein said upper assembly further includes at least one longitudinal slot in communication with said internal cavity, said longitudinal slot have a configuration capable of slidably receiving a portion of a sensor holding assembly, wherein said detonation sensor is associated with said sensor holding assembly.

6. The seismic survey system of claim 5, wherein said sensor holding assembly includes an actuator handle featuring said portion slidably receivable in said longitudinal slot, said actuator handle defining an actuator handle cavity having a configuration capable of receiving at least a portion of said detonation sensor.

7. The seismic survey system of claim 6, wherein said portion of said actuator handle is slidably receivable in said longitudinal slot is attachable to said firing pin actuator.

8. The seismic survey system of claim 3, wherein said lower assembly further includes a firing chamber attachable to said cartridge holder, said firing chamber defines a firing chamber bore having a configuration capable of receiving therethrough a firing tip of said firing pin.

9. The seismic survey system of claim 8, wherein said firing chamber further defines an internal firing chamber cavity in communication with said firing chamber bore, said internal firing chamber cavity having a configuration capable of receiving at least a portion of said cartridge holder.

10. The seismic survey system of claim 9, wherein said firing chamber bore is orientated adjacent to a primer end of the blasting cartridge when the blasting cartridge is retained in said cartridge holder and when said cartridge holder is received in said internal firing chamber cavity.

11. The seismic survey system of claim 9 further comprising a lower tube attachable to said tube and said firing chamber.

12. The seismic survey system of claim 11, wherein said lower tube includes channels defined in an external surface of said lower tube.

13. The seismic survey system of claim 3 further comprises at least one firing pin guide attachable to said firing pin, said firing pin guide having a configuration capable of being slidably received in said tube.

14. The seismic survey system of claim 1 further comprises at least one foot support assembly and at least one handle.

15. The seismic survey system of claim 1 further comprises a location antenna attachable to said upper assembly.

16. The seismic survey system of claim 1, wherein said event marking device is in communication with a recording system and is configured to communicate at least said detonation time and said geographic location to said recording system.

17. The seismic survey system of claim 1 further comprises at least one switch in electrical communication with said detonation sensor and the event marking device.

18. A seismic survey system comprising:
at least one seismic survey device comprising:
    an upper assembly defining an internal cavity and at least one slot in communication with said internal cavity;
    at least one tube attachable to said upper assembly;
    a firing pin actuator slidably received in said internal cavity, at least a portion of at least one actuator handle extending from said firing pin actuator being slidably received through said slot;
    a firing pin operably associated with said firing pin actuator;
    a lower assembly attachable to said tube, said lower assembly including a cartridge holder having a configuration capable of retaining a blasting cartridge so that said firing pin is capable of operationally detonating the blasting cartridge; and
    at least one detonation sensor capable of detecting a detonation condition of the blasting cartridge;
at least one event marking device in communication with said detonation sensor; and
at least one seismometer having a configuration capable of detecting a seismic condition created by the detonation condition of the blasting cartridge.

19. A method of using a seismic survey device comprising the steps of:
drilling at least one borehole;
providing at least one seismic survey device comprising:
    an upper assembly;
    at least one tube attachable to said upper assembly;
    a firing pin operably associated with a firing pin actuator;
    a lower assembly attachable to said tube, said lower assembly including a cartridge holder having a configuration capable of retaining a blasting cartridge so that said firing pin is capable of operationally detonating the blasting cartridge; and
    at least one detonation sensor capable of detecting a detonation condition of the blasting cartridge;
inserting said lower assembly into the borehole;
detonating the blasting cartridge inside the borehole using said firing pin;
detecting detonation of the blasting cartridge using said detonation sensor;
transmitting a signal from said detonation sensor to an event marking device; and
triggering by receipt of said signal a recordation by said event marking device of a detonation time and a geographic location of said seismic survey device.

20. The seismic survey system of claim 18, wherein said event marking device determines a detonation time and a geographic location of said seismic survey device upon triggering by receipt of a signal from said detonation sensor of said detonation condition.

21. The seismic survey system of claim 18, wherein said lower assembly further includes a firing chamber attachable to said cartridge holder, said firing chamber defines a firing chamber bore having a configuration capable of receiving therethrough a firing tip of said firing pin.

22. The seismic survey system of claim 21, wherein said firing chamber further defines an internal firing chamber cavity in communication with said firing chamber bore, said internal firing chamber cavity having a configuration capable of receiving at least a portion of said cartridge holder.

23. The seismic survey system of claim 18 further comprises at least one firing pin guide attachable to said firing pin, said firing pin guide having a configuration capable of being slidably received in said tube.

24. The seismic survey system of claim 18, wherein said firing pin or said firing pin actuator is centrally located along a longitudinal axis of said upper assembly.

25. The seismic survey system of claim 1, wherein said firing pin or said firing pin actuator is centrally located along a longitudinal axis of said upper assembly.

* * * * *